United States Patent [19]
Heinrich et al.

[11] 3,867,392

[45] Feb. 18, 1975

[54] HYDROXY-PYRIDONE-MONOSULFONIC ACIDS

[75] Inventors: Ernst Heinrich, Frankfurt(Main)-Fechenheim; Rolf Muller, Frankfurt(Main), both of Germany

[73] Assignee: Cassella Farbwerke Mainkur Aktiengesellschaft, Frankfurt, Germany

[22] Filed: Apr. 6, 1972

[21] Appl. No.: 241,845

[30] Foreign Application Priority Data
Apr. 10, 1971 Germany............................ 2117753

[52] U.S. Cl........ 260/294.8 R, 260/156, 260/247.1, 260/247.2 A, 260/289 R, 260/294.9, 260/295.5 A, 8/41 A, 8/41 B

[51] Int. Cl............................................. C07d 31/48

[58] Field of Search................... 260/294.8 R, 294.9

[56] References Cited
UNITED STATES PATENTS
3,725,383   4/1973   Austin et al.................. 260/294.8 R Primary Examiner—Alan L. Rotman
Attorney, Agent, or Firm—Connolly and Hutz

[57] ABSTRACT

4-substituted-6-hydroxy-2-pyridone-5-sulfonic acids which may be optionally substituted in the 1- and 3-positions, preparation thereof from the corresponding 6-hydroxy-2-pyridone derivatives by sulfonation and utility thereof in the preparation of dyestuffs.

6 Claims, No Drawings

HYDROXY-PYRIDONE-MONOSULFONIC ACIDS

The present invention relates to hydroxy-pyridone-monosulfonic acids of the formula

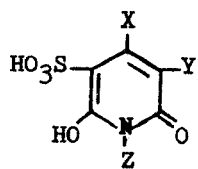
I wherein X is alkyl having 1 to 6 carbon atoms; substituted alkyl wherein the alkyl moiety has from 1 to 6 carbon atoms and said substituent is selected from the group consisting of cyano, hydroxy, methoxy, amino, methylamino and dimethylamino; cyclohexyl; substituted cyclohexyl wherein said cyclohexyl substituent is selected from the group consisting of chloro, methyl and methoxy; Y is hydrogen; cyano; alkyl having 1 to 6 carbon atoms; substituted alkyl wherein the alkyl moiety has from 1 to 6 carbon atoms and said substituent is selected from the group consisting of cyano, hydroxy, methoxy, amino, methylamino and dimethylamino; cyclohexyl; substituted cyclohexyl wherein said substituent is selected from the group consisting of chloro, methyl and methoxy; —COR wherein R is amino, methylamino, dimethylamino, cyanoethyl, methoxymethyl, cyclohexyl, cyclohexylamino, alkyl having 1 to 2 carbon atoms,

or morpholino or —SO$_2$R$^1$ wherein R$^1$ is methyl, cyclohexyl or chlorocyclohexyl; or X and Y together constitute a —(CH$_2$)$_4$— group; and Z is hydrogen; alkyl having 1 to 6 carbon atoms; substituted alkyl wherein the alkyl moiety has from 1 to 6 carbon atoms and said substituent is selected from the group consisting of cyano, hydroxy, methoxy, amino, methylamino, dimethylamino and

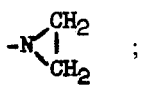
;

cyclohexyl; substituted cyclohexyl wherein the substituent is selected from the group consisting of chloro, methyl and methoxy; amino; monoalkylamino having 1 to 4 carbon atoms or dialkylamino having 1 to 4 carbon atoms in each alkyl moiety.

The preferred compounds of the present invention are of formula I wherein

X is alkyl having 1 to 4 carbon atoms,
Y is hydrogen or cyano and
Z is hydrogen, amino, alkyl having 1 to 4 carbon atoms, aminoalkyl having 1 to 4 carbon atoms, methylaminoalkyl wherein said alkyl has 1 to 4 carbon atoms or monoalkylamino having 1 to 4 carbon atoms.

When X and Z are alkyl, they preferably have from 1 to 2 carbon atoms.

The following formulae represent the particularly preferred compounds.

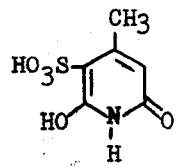  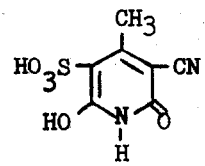

II                           III

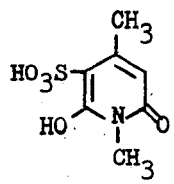  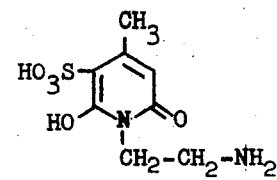

IV                           V

Those skilled in the art will appreciate the fact that the hydroxy-pyridone-monosulfonic acids of formula I of the present invention may assume a variety of tautomeric forms such as illustrated by the following:

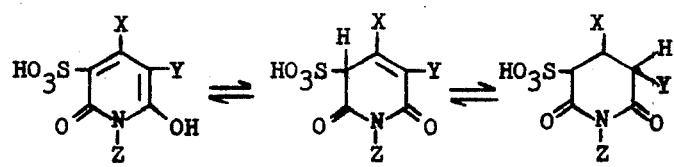

I·            Ia            Ib            Ic

Moreover and if Z is hydrogen, a variety of tautomeric forms may exist as represented by the following:

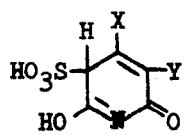  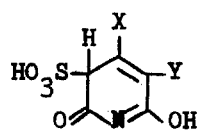  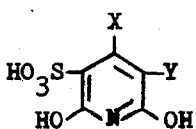

Id            Ie            If

It is expressly understood that formula I in both the specification and claims of the present invention, embraces within its scope of the tautomers thereof such as represented by the foregoing formulae.

The compounds of the present invention may be prepared, for example, by treating the appropriate 6-hydroxy-2-pyridone of the formula:

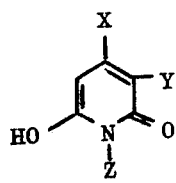

VI wherein X, Y and Z have the above-given meanings, with sulfonating agents, preferably with chlorosulfonic acid or oleum.

The initial compound of the general formula VI may also be present in various tautomeric forms. The initial compounds may be prepared analogously to the method described by Guareschi, in "Berichte der Deutschen Chemischen Gesellschaft," Referate 29, Vol. 4 (1897), pages 654–656, i.e., by condensation of correspondingly substituted acetamides or acetic acid hydrazides of the general formula VII with correspondingly substituted β-ketocarboxylic acid esters of the general formula VIII in accordance with the following reaction equation:

ethyl group. They may also be prepared according to other methods, for instance, according to that described in the monograph of E. Klingsberg: "Pyridine and its Derivatives, Part. 3" (Interscience Publishers 1962) published in the Series of Monographs "The Chemistry of Heterocyclic Compounds," edited by A. Weissgerber or by condensation, in an alkaline medium, of sulfo-acetamides or acetates with correspondingly substituted β-ketocarboxylic acid esters or β-ketocarbonamides.

The preparation of the β-ketocarboxylic acid esters of the general formula VIII can also be done according to methods known per se, for example by acylation of sodium aceto acetate with an acid chloride of the general formula IX:

$$X - CO - Cl \qquad \text{IX}$$

or by acylation of ethyl aceto acetate (formula X) with an acid chloride of the general formula IX in the presence of magnesium according to the method of M. Viscontini and N. Merckling; described in Helvetica Chimica Acta XXXV, (1952) 2280–2282 whereby the compound of the general formula XI is formed which is converted into the β-ketocarboxylic acid ester of the general formula VIIIa by subsequent acid cleavage, for example with sodium methylate in methanol according to the method of H. Hundsdiecker described in "Be-

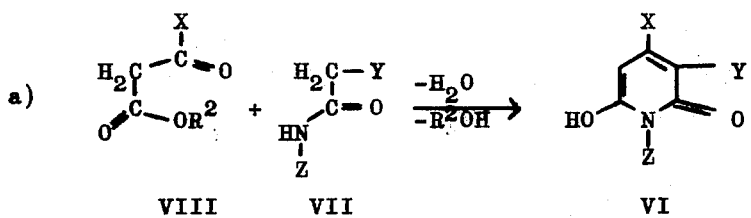

a)  VIII    VII    VI

X, Y and Z have the before mentioned meanings, R² stands for an alcyl group, in particular, the methyl or richte der deutschen chemischen Gesellschaft" 75 (1942), 454:

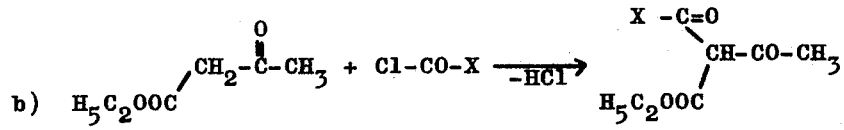

b)    X    IX    XI

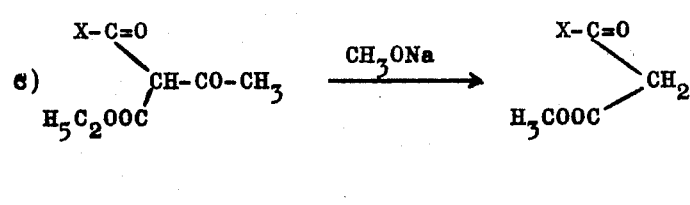

c)    XI    VIIIa

Cyanoacetamides of the general formula VII*a*

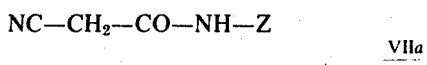

may be prepared according to the process of Naik and Bhat, described in "Quarterly Journ. Ind. Chem. Soc."4, 547–551 (1927).

If a cyanoacetamide of the general formula VII*a* is condensed, for instance, with a ketocarboxylic acid ester of the general formula VIII*a*, a compound of the general formula VI is obtained according to the above-given reaction scheme (a), in which Y is equal to CN and which is represented by the following general formula VI*a*

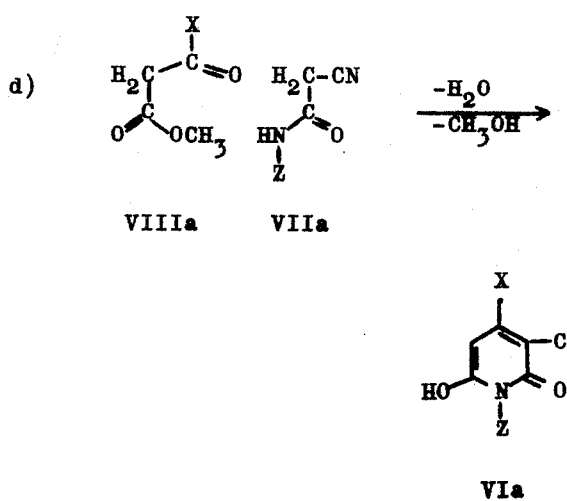

The condensation can be effected according to the process of M. Bobbitt and D. Scola described in "Journ. Org. Chem." 25 (1960) 560–560 (example 1).

Compounds of the general formula VI*a* may also be used for the preparation of compounds of the general formula VI, wherein Y is different from CN. By way of example, according to the method of Gibson and Simonsen described in "Journ. Chem. Soc." 1929, 1074–1080, it is possible to split off the 3-positioned CN-group from compounds of the general formula VI*a* by heating up to 120°C. in sulfuric acid of 60% whereby compounds of the general formula VI*b*

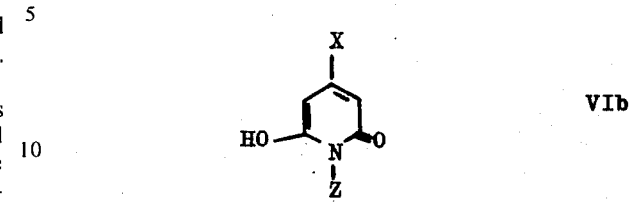

are obtained.

When heating to 50°C compounds of the general formula VI*a* with an aqueous sulfuric acid of 95%, the cyano group in 3-position is saponified to give a carbonamide group according to German document No. 2,045,851 laid open to public inspection and compounds of the general formula VI*c*

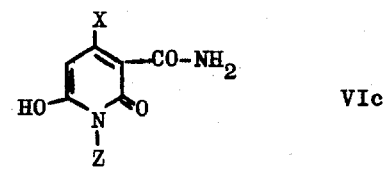

are obtained.

Compounds of the general formula VI, in which Y stands for an alkyl radical bearing 1 to 6 carbon atoms or for a cyclohexyl radical, whereby the alkyl orcyclohexyl radical may be substituted in the manner as already indicated and which are represented hereinafter by the general formula VI*d*, can be obtained by condensation of a cyano acetamide of the general formula VII*a* with a β-ketocarboxylic acid ester which is substituted in α-position by an appropriate alkyl or cyclohexyl group and has the general formula VIII*b*, analogously according to the method by M. Bobbitt and D. Scola, loc. cit. and with subsequent cleavage of the cyano group in 3-position in accordance with the method by Gibson and Simonsen loc. cit. under the following reaction scheme:

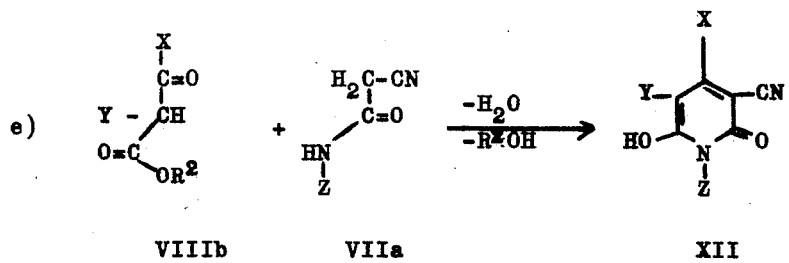

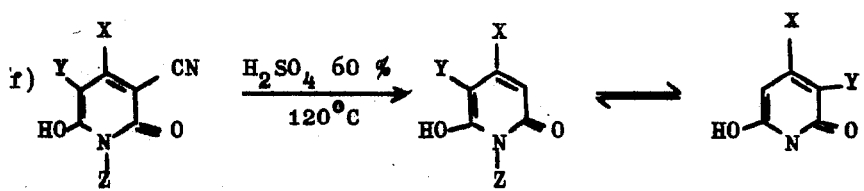

The required α-alkyl or cyclohexyl -β-ketocarboxylic acid esters are easy to prepare analogously according to the direction for the preparation of the ethyl-n-butylacetoacetate as described in Organic Synthesis, Coll. Vol. I, 248.

Starting materials of the general formula

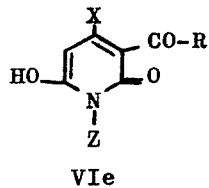

VIe and

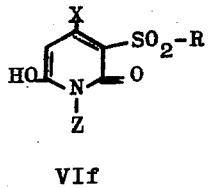

VIf can be prepared by condensing compounds of the general formula VIb with compounds of the general formulae XIII and XIV in glacial acetic acid using zinc chloride as condensation agent at temperatures of about 140° to 150°C. according the following reaction equations:

pound of the general formula VI is obtained according to the reaction equations (e) and (f), wherein X and Y constitute together a —(CH$_2$)$_4$— group

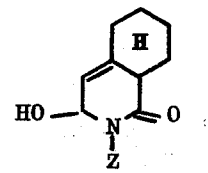

VIg

Initial compounds of the general formula VI, wherein Y stands for a —COR—group, in which R may be amino, methylamino, diethylamino, cyclohexyl amino morpholino or

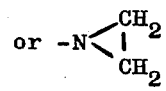

can U. Basu be prepared analogously in accordance with the method by U.Basu described in Journ. Ind.

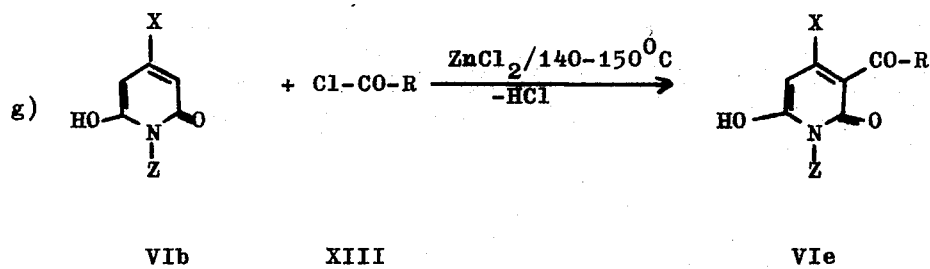

g)

VIb        XIII        VIe

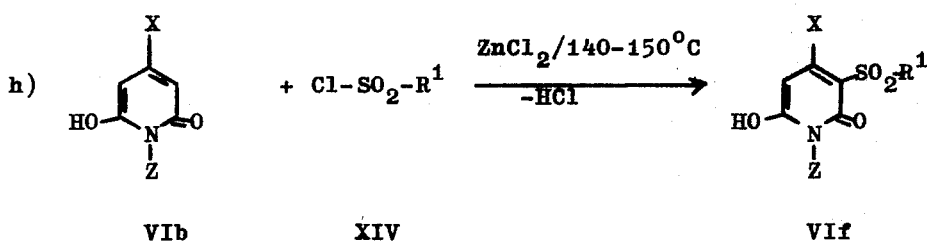

h)

VIb        XIV        VIf

If in the above-given reaction equation (e) the cyclohexanone -2-carboxylic ethyl ester (prepared according to Organic Synthesis, Coll. Vol. II, 532) is employed as β-keto-ester component, the initial com- Chem. Soc. 1935, 306 by condensation of a correspondingly substituted β-amino crotonic acid ester of the general formula XV with a correspondingly substituted malondiamide of the general formula XVI:

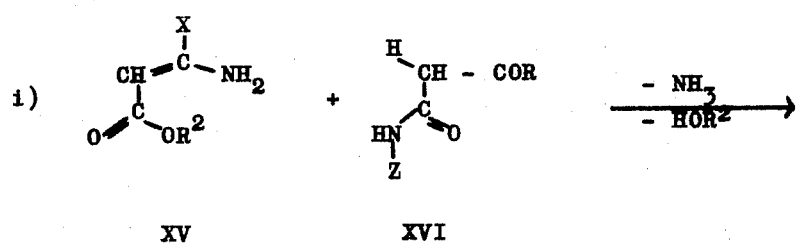

i)

XV        XVI

j)

The compounds of the present invention are valuable intermediates, in particular for the preparation of dyestuffs, preferably of azo dyestuffs. In the production of azo dyes the compounds of the present invention are utilized as coupling components. The azo dyes are prepared in a manner known per se by diazotation and coupling. A diazo component is diazotized and the diazo solution is admixed with an aqueous solution that contains the sodium salt of a compound of the present invention. Coupling being terminated, the dyestuff is isolated in the usual fashion, for instance, by spray-drying. The monoazo dyes thus obtainable are suited, for example, for the dyeing and printing of cotton, wool and polyamides according to all of the convential dyeing and printing processes and yield yellow shades with good fastness properties, in particular a good fastness to light, perspiration and washing. The properties are very good, particularly where the compounds of the present invention Y equals to hydrogen. These dyes yield, when blended with turquoise dyestuffs, very valuable, brilliant, green shades.

According to the process of the present invention these hydroxy-pyridone-monosulfonic acids contain common salt and may directly be used for the preparation of dyestuffs.

The following examples are given for the purpose of illustrating the present invention. All temperatures are given in degrees centigrade and all parts are parts by weight.

EXAMPLE 1

For the preparation of 4-methyl-6-hydroxy-2-pyridone-5-sulfonic acid, 350 parts chlorosulfonic acid are admixed at +20° – +30° with 15 parts common salt and subsequently with 63 parts 4-methyl-6-hydroxy-2-pyridone. This mixture is stirred for 4 hours at +20° – +25°, decomposed on 1,000 parts of ice and stirred for 18 hours. Subsequently, the precipitated colorless 4-methyl-6-hydroxy-2-pyridone-5-sulfonic acid is sucked off, washed on the suction apparatus with 300 parts of a common salt solution of 24° Be and dried.

Analysis: $C_6H_7O_5NS$
calc.: $N = 6.8\%$    $S = 15.6\%$    $N:S = 1:2.29$
found: $N = 5.4\%$    $S = 12.5\%$    $N:S = 1:2.31$ The data of the analysis (N:S) show that a monosulfonation of the 4-methyl-6-hydroxy-2-pyridone has taken place. The fact that the values for the nitrogen and sulfur found are smaller than those calculated is due to the common salt content of the product. The structure of the 4-methyl-6-hydroxy-2-pyridone-5-sulfonic acid has been confirmed by the nuclear resonance spectrum.

As intermediate product for the preparation of the 4-methyl-6-hydroxy-2-pyridone required as initial compound serves the 3-cyano-4-methyl-6-hydroxy-2-pyridone which, as described by BOBBITT and SCOLA in Journ. Org. Chem. 25, 560, is obtainable by condensation of ethyl aceto acetate with cyanacetamide in alcoholic alkali. It is from this product that the cyano group in 3-position is split off with sulfuric acid of 60% at 120°C. in accordance with the method described by GIBSON and SIMONSEN in Journ. Chem. Soc. 1929, 1074.

EXAMPLE 2

For the preparation of the 3-cyano-4-methyl-6-hydroxy-2-pyridone-5-sulfonic acid, 129 parts of the monosodium salt of the 3-cyano-4-methyl-6-hydroxy-2-pyridone are introduced at +20° – +25° into 450 parts sulfonic acid monohydrate. The mixture is stirred for 1 hour, subsequently 300 parts oleum of 65 % are added at the same temperature and stirring is continued for another 18 hours at +50°. After cooling down to +20°, the reaction batch is decomposed on 2,000 parts ice. Obtained is a limpid aqueous solution from which the colorless 3-cyano-4-methyl-6-hydroxy-2-pyridone-5-sulfonic acid being formed is separated by the introduction of 400 parts common salt. The reaction product is sucked off, washed on the suction apparatus with 900 parts common salt solution of 24° Be and dried.

Analysis: $C_7H_6O_5N_2S$
calc.: $N = 12.2\%$    $S = 13.9\%$    $N:S = 1:1.14$
found: $N = 8.4\%$    $S = 10.0\%$    $N:S = 1:1.17$ The data of the analysis (N:S) show that a monosulfonation of the 3-cyano-4-methyl-6-hydroxy-2-pyridone has taken place. Due to the common salt content of the product the values for the nitrogen and sulfur found are smaller than those calculated.

The structure of the 3-cyano-4-methyl-6-hydroxy-2-pyridone-5-sulfonic acid has been confirmed by the nuclear resonance spectrum.

The 3-position cyano group may be split off by heating for several hours at 100° the 3-cyano-4-methyl-6-hydroxy-2-pyridone-5-sulfonic acid in an aqueous sodium hydroxide solution of 33° Be. The reaction product obtained is identical with the 4-methyl-6-hydroxy-2-pyridone-5-sulfonic acid obtained according to Example 1.

The 3-cyano-4-methyl-6-hydroxy-2-pyridone can be obtained as indicated in Example 1 in accordance with the method described by BOBBIT and SCOLA, loc. cit.

EXAMPLE 3

For the preparation of the 1.4-dimethyl-6-hydroxy-2-pyridone-5-sulfonic acid 113 parts 1.4-dimethyl-6-hydroxy-2-pyridone are introduced at +20° – +25° into 480 parts sulfuric acid monohydrate. Subsequently, at the same temperature, 90 parts oleum of 65 % are allowed to run into this mixture and stirred for 4 hours. The sulfonation batch is then decomposed on 1,800 parts of ice. After stirring for 16 hours' time at room temperature, the separated colorless 1.4-dimethyl-6-hydroxy-2-pyridone-5-sulfonic acid is sucked off, washed on the suction apparatus with 750 parts common salt solution of 24° Be and dried.

Analysis: $C_7H_9O_5NS$
calc.: $N = 6.4\%$    $S = 14.6\%$    $N:S = 1:2.25$
found: $N = 5.1\%$    $S = 11.7\%$    $N:S = 1:2.29$ The data of the analysis (N:S) show that a monosulfonation of the 1.4-dimethyl-6-hydroxy-2-pyridone has taken place. Due to the common salt content of the product the values for the nitrogen and sulfur found are smaller than those calculated. The structure of the 1.4-dimethyl-6-hydroxy-2-pyridone-5-sulfonic acid has been confirmed by the nuclear resonance spectrum.

As intermediate product for the preparation of the 1.4-dimethyl-6-hydroxy-2-pyridone required as starting material serves the 1.4-dimethyl-3-cyano-6-hydroxy-2-pyridone which, as is analogously described by BOBBITT and SCOLA, loc. cit., can be prepared by condensation of ethyl aceto acetate with an equimolar amount of N-methyl acetamide. The cleavage of the cyano group in 3-position is effected as described in Example 1.

The following table illustrates further hydroxy-pyridone-monosulfonic acids of the present invention. In the case of initial pyridones of the general formula VI which contain in one or more X-, Y- and/or Z-positioned substituents a hydroxyl group, not only a sulfonation reaction takes place but also an esterification of the hydroxyl group(s). In the sulfonation, the sulfonic acid group is introduced into the pyridone nucleus. In the esterification, the OH-groups being present in the X-, Y- and/or Z-positioned substituents are converted to $-OSO_3H$-groups.

The sulfonic acid ester groups may be split off by treating the reaction product with dilute acids or alkalies.

Table

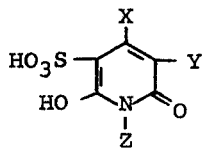

and tautomeric forms thereof

| No. | X | Y | Z | formula | calc.: N:S | found: N:S |
|---|---|---|---|---|---|---|
| 1 | $-CH_2-CH_3$ | -H | -H | $C_7H_9O_5NS$ | 1:2.29 | 1:2.31 |
| 2 | $-CH(CH_3)_2$ | -H | -H | $C_8H_{11}O_5NS$ | 1:2.28 | 1:2.32 |
| 3 | $-(CH_2)_3-CH_3$ | -H | -H | $C_9H_{13}O_5NS$ | 1:2.28 | 1:2.31 |
| 4 | $-(CH_2)_5-CH_3$ | -H | -H | $C_{11}H_{17}O_5NS$ | 1:2.29 | 1:2.32 |
| 5 | $-CH_2-CH_2-CN$ | -H | -H | $C_8H_8O_5N_2S$ | 1:1.14 | 1:1.18 |
| 6 | $-CH_2-CH_2-OH$ | -H | -H | $C_7H_9O_6NS$ | 1:2.28 | 1:2.30 |
| 7 | $-CH_2-OCH_3$ | -H | -H | $C_7H_9O_6NS$ | 1:2.28 | 1:2.31 |
| 8 | $-C_6H_{11}$ | -H | -H | $C_{11}H_{15}O_5NS$ | 1:2,28 | 1:2,26 |
| 9 | $-C_6H_{10}-CH_3$ | -H | -H | $C_{12}H_{17}O_5NS$ | 1:2,28 | 1:2,32 |
| 10 | $-C_6H_{10}-OCH_3$ | -H | -H | $C_{12}H_{17}O_6NS$ | 1:2,28 | 1:2,30 |
| 11 | $-CH_2-CH_2-NH_2$ | -H | -H | $C_7H_{10}O_5N_2S$ | 1:1,14 | 1:1,16 |
| 12 | $-CH_2-CH_3$ | -CN | -H | $C_8H_8O_5N_2S$ | 1:1,14 | 1:1,17 |
| 13 | $-CH_2-CH_2-CH_3$ | -CN | -H | $C_9H_{10}O_5N_2S$ | 1:1,14 | 1:1,18 |
| 14 | $-CH_3$ | $-(CH_2)_3-CH_3$ | -H | $C_{10}H_{15}O_5NS$ | 1:2,29 | 1:2,32 |
| 15 | $-CH_2-CH_3$ | $-C_6H_{11}$ | -H | $C_{13}H_{19}O_5NS$ | 1:2,29 | 1:2,27 |
| 16 | $-CH_3$ | $-CO-CH_3$ | -H | $C_8H_9O_6NS$ | 1:2,28 | 1:2,31 |
| 17 | $-CH_3$ | $-CO-C_6H_{11}$ | -H | $C_{13}H_{17}O_6NS$ | 1:2,28 | 1:2,26 |

Table — Continued

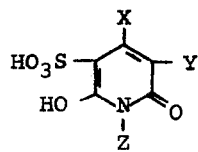

and tautomeric forms thereof

| No. | X | Y | Z | formula | calc.: N:S | found: N:S |
|---|---|---|---|---|---|---|
| 18 | $-CH_3$ | $-CO-NH_2$ | $-H$ | $C_7H_8O_6N_2S$ | 1:1,14 | 1:1,13 |
| 19 | $-CH_3$ | $-CO-N(CH_3)_2$ | $-H$ | $C_9H_{12}O_6N_2S$ | 1:1,14 | 1:1,16 |
| 20 | $-CH_3$ | $-CO-N(CH_2-CH_2)_2O$ | $-H$ | $C_{11}H_{14}O_7N_2S$ | 1:1,14 | 1:1,18 |
| 21 | $-CH_3$ | $-SO_2-CH_3$ | $-H$ | $C_7H_9O_7NS_2$ | 1:4,57 | 1:4,55 |
| 22 | $-CH_3$ | $-SO_2-C_6H_4-Cl$ | $-H$ | $C_{12}H_{16}O_7NS_2Cl$ | 1:4,57 | 1:4,60 |
| 23 | $-CH_3$ | $-CH_2-NH_2$ | $-H$ | $C_7H_{10}O_5N_2S$ | 1:1,14 | 1:1,18 |
| 24 | $-CH_2-CH_2-NH_2$ | $-CH_2-CH_2-NH_2$ | $-H$ | $C_9H_{15}O_5N_3S$ | 1:0,76 | 1:0,75 |
| 25 | $-CH_3$ | $-CH_2-CH_2-CN$ | $-H$ | $C_9H_{10}O_5N_2S$ | 1:1,14 | 1:1,12 |
| 26 | $-CH_3$ | $-CH_2-CH_2-OCH_3$ | $-H$ | $C_9H_{13}O_6NS$ | 1:2,28 | 1:2,31 |
| 27 | $-(CH_2)_3-CH_3$ | $-C_6H_3(CH_3)_2$ | $-H$ | $C_{17}H_{27}O_5NS$ | 1:2,28 | 1:2,35 |
| 28 | $-C_6H_4-OCH_3$ | $-CO-CH_2-OCH_3$ | $-H$ | $C_{15}H_{21}O_8NS$ | 1:2,29 | 1:2,30 |
| 29 | $-CH_2-CH_2-CN$ | $-CO-CH_2-CH_2-CN$ | $-H$ | $C_{12}H_{11}O_6N_3S$ | 1:0,76 | 1:0,78 |
| 30 | $-CH_2-CH_2-OCH_3$ | $-CO-N(CH_2CH_2)$ | $-H$ | $C_{11}H_{14}O_7N_2S$ | 1:1,14 | 1:1,17 |
| 31 | $-CH_2-CH_2-CH(CH_3)_2$ | $-SO_2-CH_2-CH_3$ | $-H$ | $C_{12}H_{19}O_7NS_2$ | 1:4,57 | 1:4,59 |
| 32 | $-(CH_2)_3-CH_3$ | $-CN$ | $-H$ | $C_{10}H_{12}O_5N_2S$ | 1:1,14 | 1:1,16 |
| 33 | $-CH_2-CH_2-CN$ | $-CN$ | $-H$ | $C_9H_7O_5N_3S$ | 1:0,76 | 1:0,77 |
| 34 | $-CH_2-CH_2-OCH_3$ | $-CN$ | $-H$ | $C_9H_{10}O_6N_2S$ | 1:1,14 | 1:1,12 |
| 35 | $-C_6H_5$ | $-CN$ | $-H$ | $C_{12}H_{14}O_5N_2S$ | 1:1,14 | 1:1,17 |
| 36 | $-CH_2-NH_2$ | $-CN$ | $-H$ | $C_7H_7O_5N_3S$ | 1:0,76 | 1:0,75 |
| 37 | $-CH_2-CH_2-NH_2$ | $-CN$ | $-H$ | $C_8H_9O_5N_3S$ | 1:0,76 | 1:0,77 |

Table —Continued

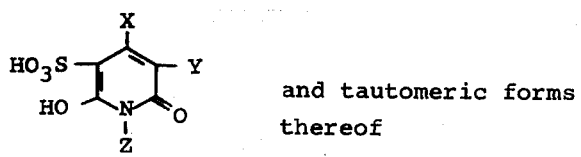

and tautomeric forms thereof

| No. | X | Y | Z | formula | calc.: N:S | found N:S |
|---|---|---|---|---|---|---|
| 38 | -CH$_3$ | -H | -NH$_2$ | C$_6$H$_8$O$_5$N$_2$S | 1:1,14 | 1:1,18 |
| 39 | -CH$_3$ | -H | -NH-CH$_3$ | C$_7$H$_{10}$O$_5$N$_2$S | 1:1,14 | 1:1,12 |
| 40 | -CH$_3$ | -H | -CH$_3$ | C$_7$H$_9$O$_5$NS | 1:2,29 | 1:2,31 |
| 41 | -CH$_3$ | -H | -CH$_2$-CH$_3$ | C$_8$H$_{11}$O$_5$NS | 1:2,28 | 1:2,26 |
| 42 | -CH$_3$ | -H | -CH$_2$-CH$_2$-CN | C$_9$H$_{10}$O$_5$N$_2$S | 1:1,14 | 1:1,16 |
| 43 | -CH$_3$ | -H | -CH$_2$-CH$_2$-OH | C$_8$H$_{11}$O$_6$NS | 1:2,29 | 1:2,32 |
| 44 | -CH$_3$ | -H | -CH$_2$-CH$_2$-NH$_2$ | C$_8$H$_{12}$O$_5$N$_2$S | 1:1,14 | 1:1,18 |
| 45 | -CH$_3$ | -H | -CH$_2$-CH$_2$-N(CH$_3$)$_2$ | C$_{10}$H$_{16}$O$_5$N$_2$S | 1:1,14 | 1:1,15 |
| 46 | -CH$_3$ | -H | -C$_6$H$_{11}$ | C$_{12}$H$_{17}$O$_5$NS | 1:2,28 | 1:2,25 |
| 47 | -CH$_3$ | -H | -(2,6-dimethoxycyclohexyl) | C$_{14}$H$_{21}$O$_7$NS | 1:2,29 | 1:2,32 |
| 48 | -CH$_3$ | -CN | -NH$_2$ | C$_7$H$_7$O$_5$N$_3$S | 1:0,76 | 1:0,78 |
| 49 | -CH$_3$ | -CN | -NH-CH$_3$ | C$_8$H$_9$O$_5$N$_3$S | 1:0,76 | 1:0,73 |
| 50 | -CH$_3$ | -CN | -CH$_3$ | C$_8$H$_8$O$_5$N$_2$S | 1:1,14 | 1:1,16 |
| 51 | -CH$_3$ | -CN | -CH$_2$-CH$_3$ | C$_9$H$_{10}$O$_5$N$_2$S | 1:1,14 | 1:1,15 |
| 52 | -CH$_3$ | -CN | -(CH$_2$)$_3$-CH$_3$ | C$_{11}$H$_{14}$O$_5$N$_2$S | 1:1,14 | 1:1,18 |
| 53 | -CH$_3$ | -CN | -CH$_2$-CH$_2$-CN | C$_{10}$H$_9$O$_5$N$_3$S | 1:0,76 | 1:0,79 |
| 54 | -CH$_3$ | -CN | -(CH$_2$)$_3$-CN | C$_{11}$H$_{11}$O$_5$N$_3$S | 1:0,76 | 1:0,75 |
| 55 | -CH$_3$ | -CN | -CH$_2$-CH$_2$-OCH$_3$ | C$_{10}$H$_{12}$O$_6$N$_2$S | 1:1,14 | 1:1,17 |

Table — Continued

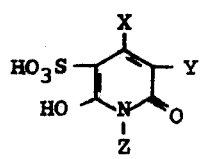

and tautomeric forms thereof

| No. | X | Y | Z | formula | calc.: N:S | found: N:S |
|---|---|---|---|---|---|---|
| 56 | -CH₃ | -CN | -CH₂-CH₂-NH₂ | C₉H₁₁O₅N₃S | 1:0,76 | 1:0,78 |
| 57 | -CH₃ | -CN | -CH₂-CH₂-N(CH₂/CH₂) | C₁₁H₁₃O₅N₃S | 1:0,76 | 1:0,76 |
| 58 | -CH₃ | -CN | ⟨H⟩-Cl (phenyl) | C₁₃H₁₆O₅N₂S | 1:1,14 | 1:1,16 |
| 59 | -CH₃ | -CN | Cl-⟨H⟩-Cl (phenyl) | C₁₃H₁₄O₅N₂SCl₂ | 1:1,14 | 1:1,18 |
| 60 | -CH₃ | -CH₃ | -CH₃ | C₈H₁₁O₅NS | 1:2,28 | 1:2,31 |
| 61 | -CH(CH₃)CH₃ | -CH₂-CH₃ | -CH₂-CH₃ | C₁₂H₁₉O₅NS | 1:2,29 | 1:2,27 |
| 62 | -CH₂-CH₃ | -CO-CH₂-CH₃ | -CH₂-CH₂-OCH₃ | C₁₃H₁₉O₇NS | 1:2,29 | 1:2,33 |
| 63 | -CH₃ | -CO-⟨H⟩ | -CH₃ | C₁₄H₁₉O₆NS | 1:2,29 | 1:2,31 |
| 64 | -CH₂-CH₂-NH₂ | -H | -CH₂-CH₂-NH₂ | C₉H₁₅O₅N₃S | 1:0,76 | 1:0,75 |
| 65 | -CH₂-CH₂-NH₂ | -CH₂-CH₂-NH₂ | -NH₂ | C₉H₁₆O₅N₄S | 1:0,57 | 1:0,55 |
| 66 | " | " | -CH₂-CH₂-NH₂ | C₁₁H₂₀O₅N₄S | 1:0,57 | 1:0,60 |
| 67 | -CH₂-CH₂-OCH₃ | -CO-NH-CH₃ | -CH₂-CH₃ | C₁₂H₁₈O₇N₂S | 1:1,14 | 1:1,18 |
| 68 | -CH₃ | -CO-NH-⟨H⟩ | -CH₃ | C₁₅H₂₀O₆N₂S | 1:1,14 | 1:1,16 |
| 69 | -CH₃ | -SO₂-CH₃ | -CH₂-CH₃ | C₉H₁₃O₇NS₂ | 1:4,57 | 1:4,60 |
| 70 | -CH₃ | -SO₂-⟨H⟩ | -CH₃ | C₁₃H₁₉O₇NS₂ | 1:4,57 | 1:4,55 |
| 71 | -⟨H⟩ | -CN | -CH₃ | C₁₃H₁₆O₅N₂S | 1:1,14 | 1:1,17 |

Table —Continued

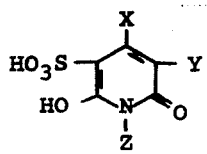

and tautomeric forms thereof

| No. | X | Y | Z | formula | calc.: N:S | found: N:S |
|---|---|---|---|---|---|---|
| 72 | $-CH_2-CH_2-CN$ | $-H$ | $-CH_3$ | $C_9H_{10}O_5N_2S$ | 1:1,14 | 1:1,18 |
| 73 | $-CH_2-CH_2-CH_3$ | $-H$ | $-CH_2-CH_3$ | $C_{10}H_{15}O_5NS$ | 1:2,29 | 1:2,31 |
| 74 | $-\langle H \rangle$ | $-H$ | $-CH_3$ | $C_{12}H_{17}O_5NS$ | 1:2,28 | 1:2,31 |
| 75 | $-CH_2-OCH_3$ | $-H$ | $-CH_3$ | $C_8H_{11}O_6NS$ | 1:2,28 | 1:2,26 |
| 76 | $-CH_2-CH_2-CH_3$ | $-CN$ | $-CH_2-CH_3$ | $C_{11}H_{14}O_5N_2S$ | 1:1,14 | 1:1,18 |
| 77 | $-\langle H \rangle$ | $-CN$ | $-(CH_2)_3-CH_3$ | $C_{16}H_{22}O_5N_2S$ | 1:1,14 | 1:1,16 |
| 78 | $-CH_2-CH_2-CN$ | $-CN$ | $-CH_3$ | $C_{10}H_9O_5N_3S$ | 1:0,77 | 1:0,75 |
| 79 | $-CH_2-CH_2-OCH_3$ | $-CN$ | $-CH_3$ | $C_{10}H_{12}O_6N_2S$ | 1:1,14 | 1:1,16 | further more

| No. | structure | formula | calc.: N:S | found: N:S |
|---|---|---|---|---|
| 80 | 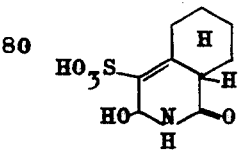 | $C_9H_{11}O_5NS$ | 1:2,28 | 1:2,30 |
| 81 | 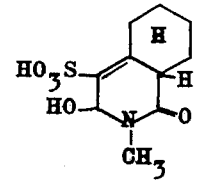 | $C_{10}H_{13}O_5NS$ | 1:2,28 | 1:2,32 |
| 82 | 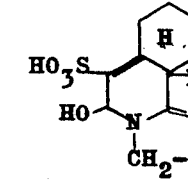 | $C_{11}H_{16}O_5N_2S$ | 1:1,14 | 1:1,16 |

EXAMPLE 4

281 g. 4-β-sulfatoethylsulfonyl-aniline are diazotized in the usual manner. The diazo suspension is added to a solution of 205 g. 6-hydroxy-4-methyl-2-pyridone-3-sulfonic acid in 1,000 c.c. aqueous 1N sodium hydroxide solution admixed with 120 g. sodium bicarbonate. The coupling being terminated, the pH is adjusted to 6.0 and the dyestuff of the formula

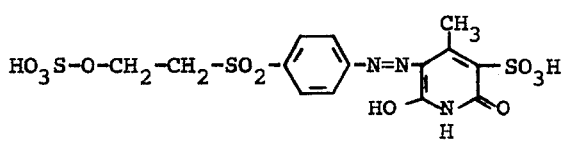

is isolated by spray-drying. When applied, for instance, according to the following prescription, it yields valuable yellow prints showing in particular a good fastness to wet processing.

A fabric of mercerized or alkalized cotton is printed with the following printing paste:

```
  50 g.  of the above dyestuff
  50 g.  urea
 425 g.  hot water
 450 g.  alginate thickener
  15 g.  sodium bicarbonate
  10 g.  sodium salt of the m nitrobenzene sulfonic acid
1000 g.
```

The print may be fixed either by steaming at 103°–105° or by thermosetting. Subsequently, the fabric is rinsed and soaped in both cases.

We claim:
1. Hydroxy-pyridone-monosulfonic acids of the formula

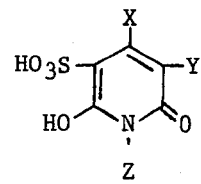

and the tautomers thereof wherein X is alkyl having 1 to 6 carbon atoms; substituted alkyl wherein the alkyl moiety has from 1 to 6 carbon atoms and said substituent is selected from the group consisting of hydroxy and methoxy; cyclohexyl or substituted cyclohexyl wherein said cyclohexyl substituent is selected from the group consisting of chloro, methyl and methoxy; Y is hydrogen; alkyl having 1 to 6 carbon atoms; substituted alkyl wherein the alkyl moiety has from 1 to 6 carbon atoms and said substituent is selected from the group consisting of hydroxy and methoxy; cyclohexyl; substituted cyclohexyl wherein said substituent is selected from the group consisting of chloro, methyl and methoxy or -COR wherein R is methoxymethyl, cyclohexyl or alkyl having 1 to 2 carbon atoms and Z is hydrogen; alkyl having 1 to 6 carbon atoms; substituted alkyl wherein the alkyl moiety has from 1 to 6 carbon atoms and said substituent is selected from the group consisting of hydroxy and methoxy; cyclohexyl and substituted cyclohexyl wherein the substituent is selected from the group consisting of chloro, methyl and methoxy.

2. The hydroxy-pyridone-monosulfonic acids of claim 1 wherein X is alkyl having 1 to 4 carbon atoms, Y is hydrogen and Z is hydrogen, or alkyl having 1 to 4 carbon atoms.

3. The hydroxy-pyridone-monosulfonic acids of claim 2 wherein X is alkyl having 1 to 2 carbon atoms.

4. The hydroxy-pyridone-monosulfonic acids of claim 2 wherein Z is alkyl having 1 to 2 carbon atoms.

5. The hydroxy-pyridone-monosulfonic acids of claim 1 wherein X is methyl and Y and Z are hydrogen.

6. The hydroxy-pyridone-monosulfonic acids of claim 1 wherein X and Z are methyl and Y is hydrogen.

* * * * *